US012431113B2

(12) United States Patent
Schreibman et al.

(10) Patent No.: US 12,431,113 B2
(45) Date of Patent: Sep. 30, 2025

(54) AUDIO FILTER SYSTEM

(71) Applicant: GM Global Technology Operations LLC, Detroit, MI (US)

(72) Inventors: Amos Schreibman, Hod Hasharon (IL); Elior Hadad, Ness-Ziona (IL); Eli Tzirkel-Hancock, Raanana (IL)

(73) Assignee: GM Global Technology Operations LLC, Detroit, MI (US)

( * ) Notice: Subject to any disclaimer, the term of this patent is extended or adjusted under 35 U.S.C. 154(b) by 206 days.

(21) Appl. No.: 18/468,160

(22) Filed: Sep. 15, 2023

(65) Prior Publication Data

US 2025/0095625 A1 Mar. 20, 2025

(51) Int. Cl.
*G10K 11/175* (2006.01)
*G10K 11/178* (2006.01)

(52) U.S. Cl.
CPC .... *G10K 11/1752* (2020.05); *G10K 11/17853* (2018.01)

(58) Field of Classification Search
CPC .......... G10K 11/1752; G10K 11/17853; G10L 21/0208; G10L 25/06; G10L 2021/02166; H04R 1/406; H04R 3/005; H04R 2430/25; H04R 2499/13
USPC .......................................................... 381/73.1
See application file for complete search history.

(56) References Cited

U.S. PATENT DOCUMENTS 9,591,404 B1 * 3/2017 Chhetri .................. H04R 3/005

* cited by examiner

*Primary Examiner* — Paul Kim
(74) *Attorney, Agent, or Firm* — Honigman LLP; Matthew H. Szalach; Jonathan P. O'Brien

(57) ABSTRACT

A computer-implemented method executed by data processing hardware causes the data processing hardware to perform operations that include receiving multiple audio signals from a sensor array. The multiple audio signals include a target audio signal and interference audio signals. The data processing hardware then identifies a design constraint based on the multiple audio signals. The desired constraint includes a pass constraint corresponding to the target audio signal and a null constraint corresponding to the interference audio signals. The data processing hardware then compares a design filter weight of the design constraint with a filter weight maximum, designs an audio filter using the desired constraint, and filters the multiple audio signals using the designed audio filter.

14 Claims, 6 Drawing Sheets

AUDIO FILTER SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to an audio filter system.

Beamforming techniques are typically used to enhance desired speech signals. Typical beamforming techniques use spatial diversity of microphones to enhance the desired speaker's voice. However, background noise and other unintended signals may interfere with the desired speech signals. Diagonal loading techniques are traditionally applied to a beamforming filter to increase the filter robustness to model mismatch. The use of the diagonal loading techniques often results in rigorous searching to achieve the desired output.

SUMMARY

In some aspects, a computer-implemented method is executed by data processing hardware. The computer-implemented method causes the data processing hardware to perform operations that include receiving, from a sensor array, multiple audio signals. The multiple audio signals include a target audio signal and interference audio signals. The data processing hardware then identifies a design constraint based on the multiple audio signals. The design constraint includes a pass constraint corresponding to the target audio signal and a null constraint corresponding to the interference audio signal. Next, the data processing hardware generates an asymmetrical white noise gain surface from the audio signals in response to a design filter weight exceeding a filter weight maximum and converts the asymmetrical white noise gain surface to a symmetrical white noise gain surface using a whitening function. The data processing hardware then transforms the extremum point from the symmetrical white noise gain surface to the asymmetrical white noise gain surface, updates the design constraint with the extremum point, and filters the multiple audio signals using the extremum point and identified non-binary values.

In some examples, the method may include designing an audio filter using the updated design constraint. Designing the audio filter may include reducing the design filter weight and comparing the reduced value with the filter weight maximum. The method may also include executing the whitening function using Cholesky decomposition. In some examples, the method may define a cost function and may derive a maximal point by a closed form mathematical equation using the defined cost function. Identifying the extremum point may include comparing the extremum point with the maximal point and identifying a correlation between the extremum point and the maximal point. The extremum point may be defined by a maximal distance between a first point associated with the pass constraint and a second point associated with the null constraint.

In other aspects, an audio filter system for a vehicle includes data processing hardware and memory hardware in communication with the data processing hardware. The memory hardware stores instructions that when executed on the data processing hardware cause the data processing hardware to perform operations. The data processing hardware receives, from a sensor array, multiple audio signals. The data processing hardware then identifies a design constraint based on the multiple audio signals. The data processing hardware generates an asymmetrical white noise gain surface in response to a design filter weight exceeding a filter weight maximum and converts the asymmetrical white noise gain surface to a symmetrical white noise gain surface using a whitening function. The data processing hardware then identifies an extremum point on the symmetrical white noise gain surface for the design constraint and transforms the extremum point from the symmetrical white noise gain surface to the asymmetrical white noise gain surface. Finally, the data processing hardware updates the design constraint with the extremum point and filters the multiple audio signals using the extremum point.

In some examples, the data processing hardware may design an audio filter using the design constraint. The data processing hardware may design the audio filter by reducing a value of filter weights of the designed audio filter and comparing the reduced value with the designed constraint. In some configurations, the data processor hardware determines whether the extremum point corresponding with a maximal point. Optionally, the data processing hardware may, when identifying the extremum point, define a cost function. The data processing hardware may then derive the maximal point by a closed form mathematical equation using the defined cost function. The maximal point may be defined by a maximal distance between a first point associated with a pass constraint of the design constraint and a second point associated with a null constraint of the design constraint.

In other aspects, a computer-implemented method executed by data processing hardware causes the data processing hardware to perform operations that include receiving multiple audio signals from a sensor array. The multiple audio signals include a target audio signal and interference audio signals. The data processing hardware then identifies a design constraint based on the multiple audio signals. The desired constraint includes a pass constraint corresponding to the target audio signal and a null constraint corresponding to the interference audio signals. The data processing hardware then compares a design filter weight of the design constraint with a filter weight maximum, designs an audio filter using the desired constraint, and filters the multiple audio signals using the designed audio filter.

In some examples, the data processing hardware may, when designing the audio filter, determine the design filter weight exceeds the filter weight maximum and, in response, generates an asymmetrical white noise gain surface using the designed audio filter. The data processing hardware may then convert the asymmetrical white noise gain surface to a symmetrical white noise gain surface using a whitening function. The data processing hardware may then identify an extremum point on the symmetrical white noise gain surface for the desired constraint. Optionally, the data processing hardware may transform the extremum point from the symmetrical white noise gain surface to the asymmetrical white noise gain surface and updating the design constraint with the extremum point. In some configurations, the data processing hardware, when filtering the multiple audio signals, may use the extremum point.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
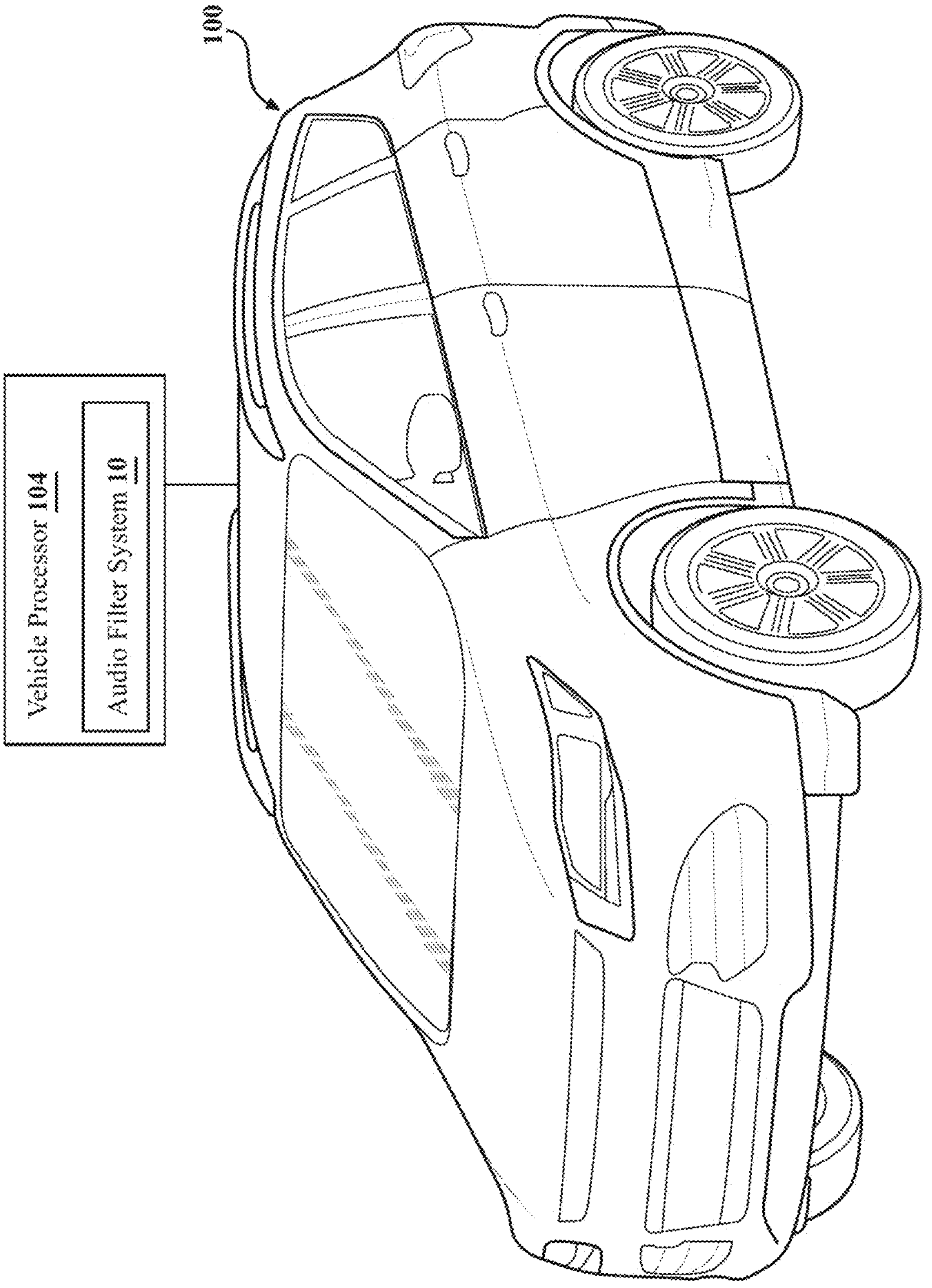
FIG. 1 is a schematic view of a vehicle with an audio filter system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-6, an audio filter system 10 may be incorporated in a vehicle 100. In some examples, the audio filter system 10 may be incorporated into any practicable location within the vehicle 100 where audio filtration may be advantageous. For example, the audio filter system 10 may be incorporated into both vehicle and non-vehicle audio capture settings. The audio filter system 10 is described herein with respect to the vehicle 100 for purposes of exemplary functional explanation. However, the audio filter system 10 may be utilized in non-vehicle examples.

The vehicle 100 may be equipped with a sensor array 102 configured to capture audio signals 12 within the vehicle 100. The sensor array 102 may include, but is not limited to, a microphone array that captures the audio signals 12 and transmits the audio signals 12 to the audio filter system 10. The audio filter system 10 includes data processing hardware 14 and a memory hardware 16 that is in communication with the data processing hardware 14. The data processing hardware 14 is configured to receive the audio signals 12. It is generally contemplated that the audio filter system 10 includes a computer-implemented method 18 that is executed by the data processing hardware 14 and causes the data processing hardware 14 to perform various operations, described herein. Additionally or alternatively, the memory hardware 16 may store the computer-implemented method 18 as an instruction that, when executed on the data processing hardware 14, causes the data processing hardware 14 to perform the operations described herein.

Figure 2:
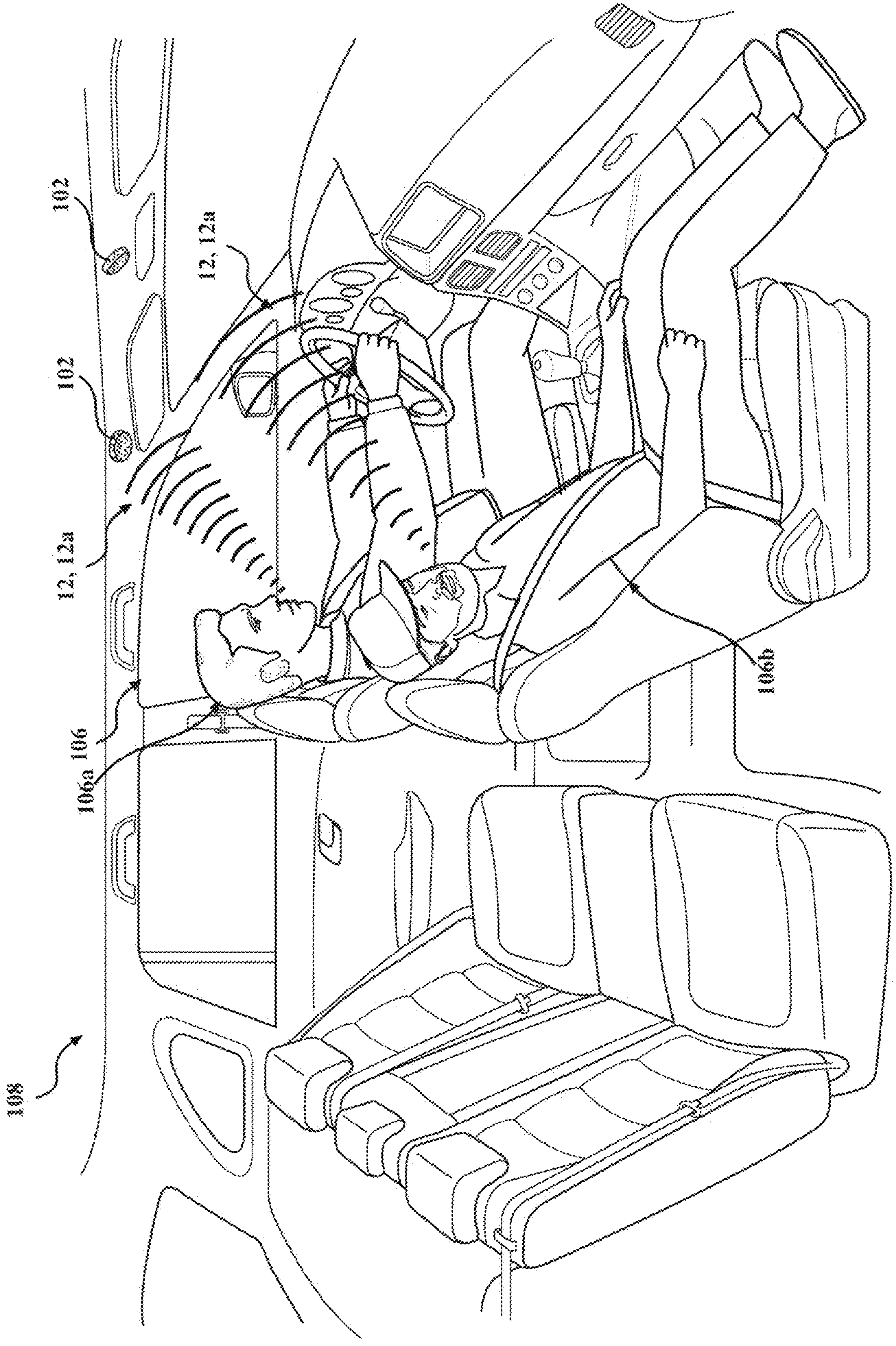
FIG. 2 is a partial perspective view of an interior cabin of a vehicle with a sensor array according to the present disclosure.
Figure 3:
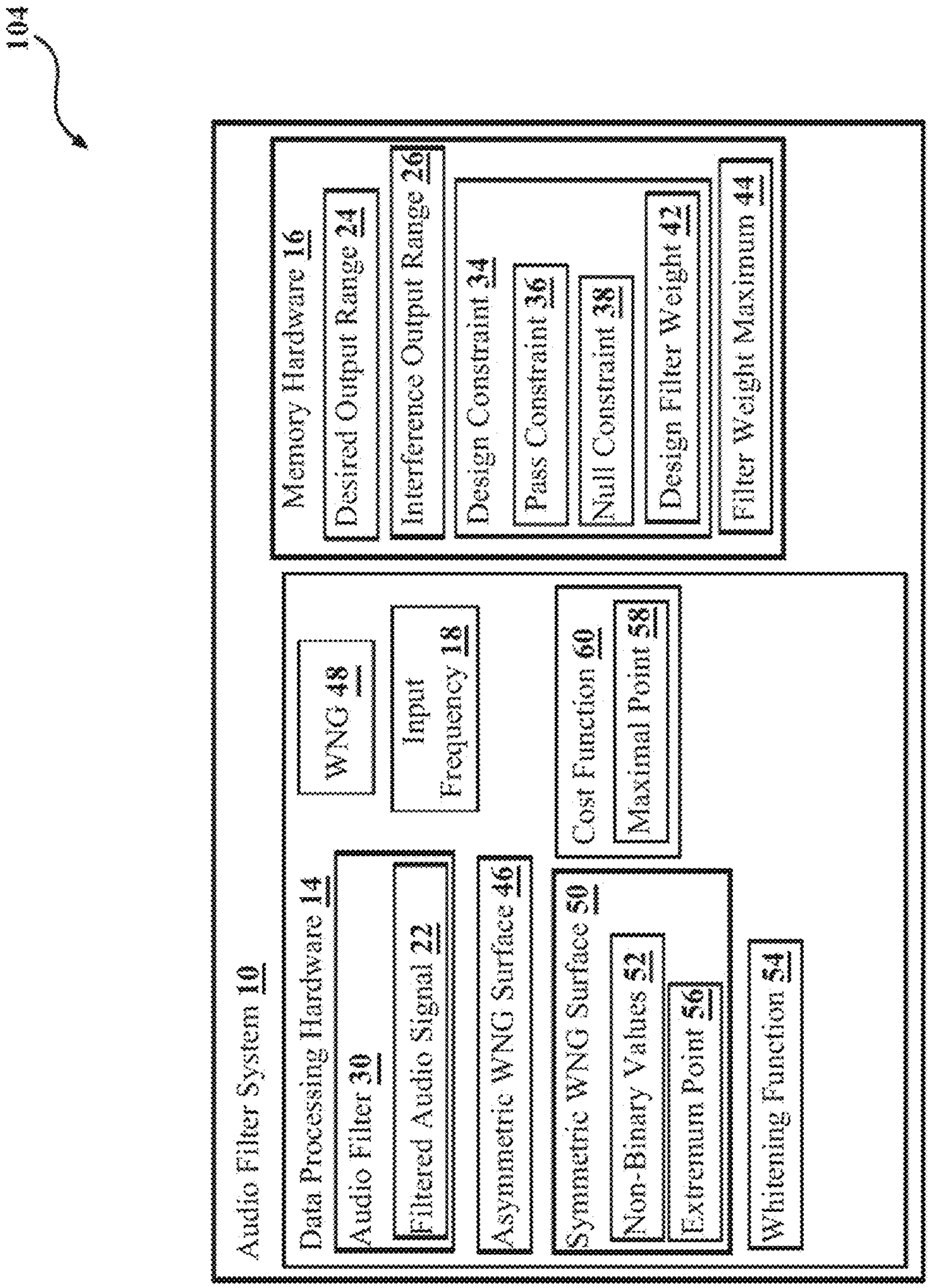
FIG. 3 is a functional block diagram of a vehicle controller including an audio filter system according to the present disclosure.

Referring to FIGS. 1-3, the audio filter system 10 may be configured as part of a vehicle computer or controller 104. For example, the sensor array 102 receives the audio signals 12 and transmits the audio signals to the vehicle controller 104. The vehicle controller 104, in response to receiving the audio signals 12, may initiate the audio filter system 10. For example, the vehicle controller 104 may execute the computer-implemented method 18 of the audio filter system 10. The audio filter system 10 is configured to filter the audio signals 12 and identify a speaker. The speaker is typically an occupant 106 in the vehicle 100. It is contemplated that the audio filter system 10 may distinguish between multiple occupants 106 speaking at the same time using the computer-implemented method 18 described herein.

The audio signals 12 may include one or more target audio signals 12*a* and one or more interference audio signals 12*b*. The audio filter system 10 is configured to filter out the interference audio signals 12*b* and amplify or otherwise enhance the target audio signals 12*a*. The resultant signal is a filtered audio signal 12*c* containing minimal to no interference audio signals 12*b*. The filtered audio signal 12*c* may be communicated with a third party processor that is in communication with the vehicle controller 104 and configured to receive the filtered audio signals 12*c*.

For example, FIG. 2 illustrates a first occupant 106*a* and a second occupant 106*b* simultaneously emitting audio signals 12 with the sensor array 102 disposed within an interior cabin 108 of the vehicle 100. Although the interference audio signals 12*b* are illustrated as coming from the second occupant 106*b*, other noises, such as interior or exterior background noise, road noise, and wind, among other examples, may be the source of the interference audio signals 12*b*. In the illustrated example, the sensor array 102 is configured to receive each audio signal 12*a*, 12*b* from the respective occupants 106*a*, 106*b*, which are then transmitted to the audio filter system 10. While the sensor array 102 is illustrated as being at a forward portion of the interior cabin 108, it is contemplated that the sensor array 102 may be positioned at any practicable location within the interior cabin 108 to capture the audio signals 12. For example, the sensor array 102 may be positioned in locations including, but not limited to, a rearward portion, sideward portions, and a central portion of the interior cabin 108.

With reference now to FIGS. 3-6, FIG. 4 illustrates one example of execution of the audio filter system 10. The method and process of executing the audio filter system 10 is described in more detail below. With respect to FIG. 4, the audio signals 12 are represented by a series of signals 18-22. An input signal 18 illustrates the audio signals 12 received by the audio filter system 10. The input signal 18 includes an entire range of sources as detected by the sensor array 102 prior to filtration by the audio filter system 10. Thus, as illustrated, the input signal 18 spans a desired output range 24 and an interference output range 26.

A traditional linearly constrained minimum variance (LCMV) output signal 20 is illustrated below the input signal 18. The traditional LCMV output signal 20 is generated using a traditional LCMV filter 28 that may be incorporated with the vehicle controller 104. For example, the traditional LCMV filter 28 may be stored as part of the audio filter system 10. The audio filter system 10 may include the traditional LCMV filter 28 and a designed audio filter 30, described below. Both the traditional LCMV filter 28 and the designed audio filter 30 are configured to filter the audio signals 12 received by the audio filter system 10 to reduce the interference audio signals 12*b* and to maximize the target audio signals 12*a*. The traditional LCMV filter 28 operates in binary function. For example, the value constraints for the traditional LCMV filter 28 are set to one (1) for the target sources and zero (0) for the interference sources. Comparatively, as described below, the audio filter system 10 described herein is configured to utilize non-binary values in a constraint set.

Figure 4:
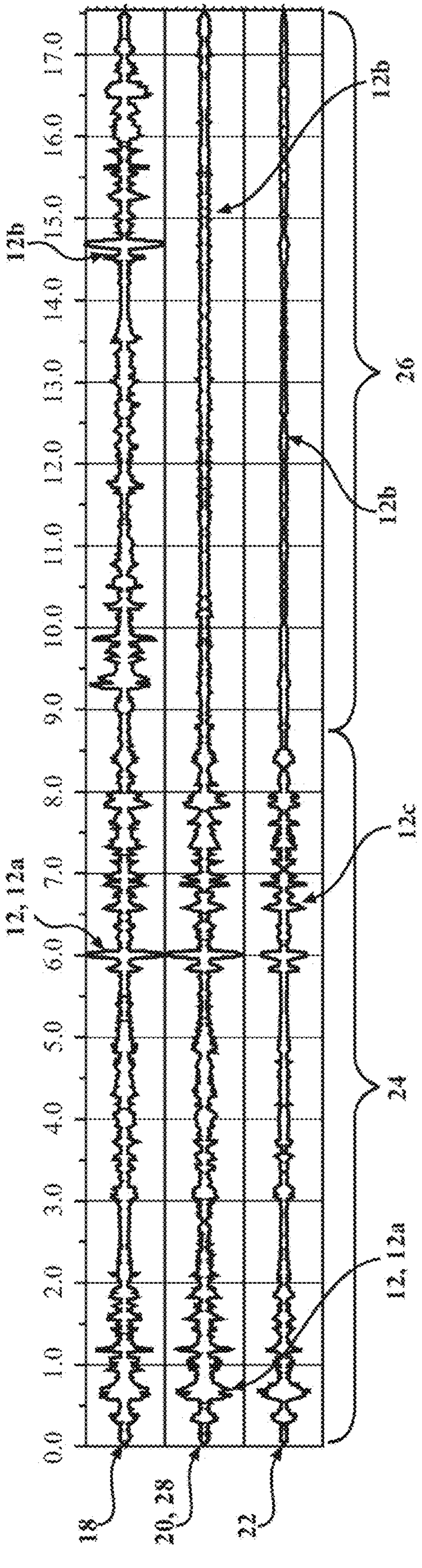
FIG. 4 is an example schematic diagram of an input signal, a traditional linear constrained minimum variance output signal, and a filter audio output signal according to the present disclosure.

It is contemplated that the interference audio signals 12*b* may be more clearly defined within the interference output range 26 and the target audio signal 12*a* is defined within the desired output range 24. However, the audio signals 12 received span both the desired output range 24 and the interference output range 26, such that the interference audio signals 12*b* may be mixed with the target audio signal 12*a* within the desired output range 24. Thus, the designed audio filter 30 is configured to selectively filter the audio signals 12 to remove or reduce the target audio signal 12*a*. FIG. 4 illustrates the result of the designed audio filter 30 most clearly with respect to the reduction of the interference audio signals 12*b* within the interference output range 26, as compared with the input signal 18 and, in particular, the traditional LCMV output signal 20.

As depicted in the example of FIG. 4, the traditional LCMV filter 28 outputs the traditional LCMV output signal 20, which has a reduced output in the interference range 26 as compared with the input signal 18. For example, the input signal 18 has an increased output in the interference output range 26 as compared with the traditional LCMV output signal 20, which generally corresponds to the presence of the interference audio signals 12*b*. A lower output within the interference range 26 is achieved by the audio filter system 10 identifying the target audio signal 12*a* and filtering any potential interference audio signals 12*b*. Thus, the traditional LCMV filter 28 may produce a reduced traditional LCMV output signal 20 within the interference range 26 as compared with the input signal 18.

Comparatively, the designed audio filter 30 further reduces the audio signals 12 within the interference range 24. FIG. 4 illustrates that a filtered audio signal 22, provided by the designed audio filter 30, is generally reduced across both the desired output range 24 and the interference output range 26. The reduction in the filtered audio frequency 22 in the desired output range 24 as compared with the input signal 18 and the traditional LCMV output signal 20 is a result of the improved noise filtration by the designed audio filter 30. The designed audio filter 30 is configured to filter the interference audio signals 12*b* across both the desired output range 24 and the interference output range 26. The reduction of the interference audio signals 12*b* by the designed audio filter 30 advantageously provides a clear filtered audio signal 22 with minimal interference noise as compared with the unfiltered, input signal 18 and the traditional LCMV output signal 20.

With continued reference to FIGS. 3-6, the vehicle controller 104 is configured to design the designed audio filter 30 using a series of mathematical processes. As mentioned above, the data processing hardware 14 includes the memory hardware 16, which may store a design constraint 34 that may be utilized by the data processing hardware 14 when designing the audio filter 30. The design constraint 34 includes a pass constraint 36 and a null constraint 38 configured as an initial filter for the designed audio filter 30. The pass constraint 36 is utilized by the data processing hardware 14 to identify which sources of the audio signals 12 to pass through the designed audio filter 30, and the null constraint 38 identifies which sources of the audio signals 12 to filter out, or cancel, before outputting the filtered audio signal 12*c*.

The design constraint 34 may be a soft constraint gain that may be denoted in the equation below as (g). The data processing hardware 14 may also utilize a spatial constraint matrix C based on the audio signals 12 received from the sensor array 102. The data processing hardware 14 may design the audio filter 30 using each of the design constraint 34 and the spatial constraint matrix (C) in combination with a spatial noise correlation matrix ($\Phi_V$). An example equation for designing the audio filter 30, represented by ($w_{30}$), is:

$$w_{30} = \Phi_V^{-1} C \left[ C^H \Phi_V^{-1} C \right]^{-1} g$$

The design constraint 34 includes a design filter weight 42, and the memory hardware 16 may include a predetermined white noise gain (WNG) filter weight maximum 44 that may be utilized in comparison with the design filter weight 42. The data processing hardware 14 is configured to identify values for each of the pass constraint 36 and the null constraint 38, which may be utilized to determine the design filter weight 42. It is advantageous for the difference between the values of each of the pass constraint 36 and the null constraint 38 to be maximal, as a maximal difference corresponds to minimal distortion of the target audio signal 12*a* and maximal attenuation of the interference audio signals 12*b*.

The design constraint 34 may be further defined as a white noise gain (WNG) constraint. The data processing hardware 14 may compare the design filter weight 42 with a WNG filter weight maximum 44 to identify whether the design filter weight 42 is below the WNG filter weight maximum 44. If the design filter weight 42 is below the WNG filter weight maximum 44, then the data processing hardware 14 may proceed with utilizing the design constraint 34 in designing the audio filter 30. In some examples, the design filter weight 42 may exceed the WNG filter weight maximum 44 and, thus, the data processing hardware 14 may execute further steps in order to design the audio filter 30. In response to exceeding the WNG filter weight maximum 44, the design filter weight 42 may be reduced, described below, to achieve a value below the WNG filter weight maximum 44.

With further reference to FIGS. 3-6, if the design filter weight 42 exceeds the WNG filter weight maximum 44, then the data processing hardware 14 may generate an asymmetrical white noise gain (WNG) surface 46. The asymmetrical WNG surface 46 is defined on a constraints plane and includes different focal widths for each axis on which the asymmetrical WNG surface 46 is defined. In some examples, the asymmetrical WNG surface 46 may be an elliptical surface that may be defined by a white noise gain (WNG) 48, which may be an expression of the above example equation. The WNG 48 may be defined as a reflection of the sensitivity of the sensor array 102 to random variations in the surroundings and/or components of the sensor array 102, including positions and responsiveness of sensors. In the below example equation, the value 0 corresponds to the interference audio signals 12*b* to be mitigated and the value 1 corresponds to the target audio signal 12*a* to enhance. An example equation for the WNG 48, where the audio signals 12 locations are represented by (h) is:

$$WNG^{-1} = \frac{p^H h^H h p}{\|h_0\|^2 \|h_1\|^2 \sin^2(\theta)}$$

Where $h = [-h_0 \;\; h_1]$, $p = [g_1 \;\; g_0]^T$, and $\sin^2(\theta) = \left(1 - \frac{|h_0^H h_1|^2}{\|h_0\|^2 \|h_1\|^2}\right)$ In further defining the audio filter 30, the asymmetrical WNG surface 46 is converted by the data processing hardware 14 to a symmetrical WNG surface 50. In some examples, the symmetrical WNG surface 50 is a circular WNG surface. The conversion of the asymmetrical WNG surface 46 may include reducing the value of the filter weight 42, as noted above, as the data processing hardware 14 may more efficiently search the symmetrical WNG surface 50 as compared with searching the asymmetrical WNG surface 46. The symmetrical WNG surface 50 may advantageously assist the data processing hardware 14 in searching for a non-binary value 52 for the design constraint 34. For example, the data processing hardware 14 may identify binary values, such as 1 and 0, along the asymmetrical WNG surface 46, whereas the data processing hardware 14 is configured to identify the non-binary values 52 on the symmetrical WNG surface 50. The non-binary values 52 may include, but are not limited to, values such as a non-binary value of 0.9 corresponding to the target audio signal 12*a* and a non-binary value of 0.2 corresponding to the interference audio signals 12*b*. Other non-binary values 52 may be used in identifying the various audio signals 12. An example equation for the symmetrical WNG surface 50 is:

$$WNG^{-1} = \frac{g_p^H \Psi^H h^H h \Psi g_p}{\|h_0\|^2 \|h_1\|^2 \sin^2(\theta)}$$

Where $g_p = \Psi^{-1} p$ and $\Psi$ may be defined as the inverse square root of $h^H h$, such as $$\Psi^H h^H h \Psi = I$$

Using the above equation, the symmetrical WNG surface 50 may be defined for improved ease of searching for non-binary values 52. The non-binary values 52 advantageously assist the data processing hardware 14 in designing the audio filter 30, as non-binary values 52 provide interference control over the WNG value. The non-binary values 52 provide increased refinement in designing the audio filter 30. For example, the non-binary values 52 may be used to define the filtered audio signal 12*c* with the designed audio filter 30. Thus, the non-binary values 52 may assist in the design of the audio filter 30 to improve the use of the audio filter 30 within small or otherwise confined spaces. For example, the designed audio filter 30 may have improved spatial attenuation by extracting the desired audio signals 12 from a localized area and attenuating the interference audio signals 12 in surrounding areas. The improved spatial attenuation may be achieved by identifying the non-binary values 52. Further, an equal WNG curve may be defined on the whitened, symmetrical WNG surface 50. An example equation of the equal WNG curve, where (r) controls the WNG level and ($\phi$) defines gain values, is:

$$g_p = [r \sin(\phi) \;\; r \cos(\phi)]^T$$

Where r is calculated as $r = WNG\sqrt{\|h_0\|^2 \|h_1\|^2 \sin^2(\theta)}$

The original gain level (p) may be obtained from ($g_p$) by multiplying $\Psi$ with ($g_p$). The asymmetrical WNG surface 46 is converted to the symmetrical WNG surface 50 using a whitening function 54. The whitening function 54 is a transformation of random variables with a known covariance matrix into a set of new variables whose covariance is an identity matrix. The whitening function 54 may include, but is not limited to, a Cholesky decomposition. When using Cholesky decomposition, $\Psi$ is an upper triangular matrix with $\Psi(2,2)$, a real number. Given this characteristic, a desired source gain ($g_0$) may be expressed by an example equation: $g_0 = \Psi(2,2) g_p(2)$. The desired source gain ($g_0$) is also a real number, which indicates that the desired source gain ($g_0$) is free from phase distortion. Thus, the whitening function 54 is advantageously free from phase distortion toward the target audio signal 12*a*. Thus, the audio signals 12 may be filtered without affecting the filtered audio signal 12*c* phase.

With further reference to FIGS. 3-6, the data processing hardware 14 may execute a series of equations to search the symmetrical WNG surface 50 for an extremum point 56. The extremum point 56 may be defined by a maximal distance between a first point associated with the pass constraint 36 and a second point associated with the null constraint 38. Ultimately, the extremum point 56 corresponds to a maximal point 58, which defines maximal separation between the desired audio signal 12*a* and the undesired audio signals 12*b* under a given WNG value. For example, the audio filter system 10 may identify a correlation between the extremum point and the maximal point 58. Identifying the extremum point 56 includes defining a cost function 60 that identifies the maximal point 58. The maximal point 58 may be derived by a closed form mathematical equation that utilizes the defined cost function 60. An example cost function equation used to identify the maximal separation is:

$$f(\phi) = \frac{|g_0|^2}{|g_1|^2} = \frac{|\Psi(2,2)|^2\cos^2(\phi)}{|\Psi(1,1)|^2\sin^2(\phi) + |\Psi(1,2)|^2\cos^2(\phi) + \mathrm{Re}\{\Psi(1,1)\Psi(1,2)\}\sin(2\phi)}$$

$$\text{Where } g_p = [r\sin(\phi)\ \ r\cos(\phi)]^T \text{ and } p = (\Psi g_p)^*$$

The extremum point 56 may be a function of the above equation and may be provided by the following example equation:

$$\phi_{ext} = \tan^{-1}\left(\frac{-\mathrm{Re}\{\Psi(1,1)\Psi(1,2)\}}{|\Psi(1,1)|^2}\right)$$

The data processing hardware 14 may confirm that the identified extremum point 56 with the maximal point 58 to determine whether the extremum point 56 corresponds to the maximal point 58. An example equation to verify the maximal point 58 is $\mathrm{Re}\{\Psi(1,1)\Psi(1,2)\}\sin(2\phi_{ext}) > |\Psi(1,1)|^2\cos(2\phi_{ext})$. If the extremum point 56 does not match the maximal point 58, then the data processing hardware 14 may add a value corresponding to pi (π) divided by two (2) to achieve the maximal point 58.

Once the extremum point 56 is identified, the symmetrical WNG surface 50 may be transformed back to the asymmetrical WNG surface 46. The extremum point 56, which corresponds to the maximal point 58, can be transformed from the symmetrical WNG surface 50 to the asymmetrical WNG surface 46. The data processing hardware 14 utilizes the extremum point 56 in a final step of designing the audio filter 30. For example, the audio filter system 10 may define a new design constraint 34 based on the identified extremum point 56. The new design constraint 34 is utilized by the data processing hardware 14 to design the audio filter 30. For example, the audio filter 30 is updated with the identified extremum point 56. Once the audio filter 30 is designed, the extremum point 56 may be utilized by the audio filter 30 to filter the audio signal 12.

Figure 5:
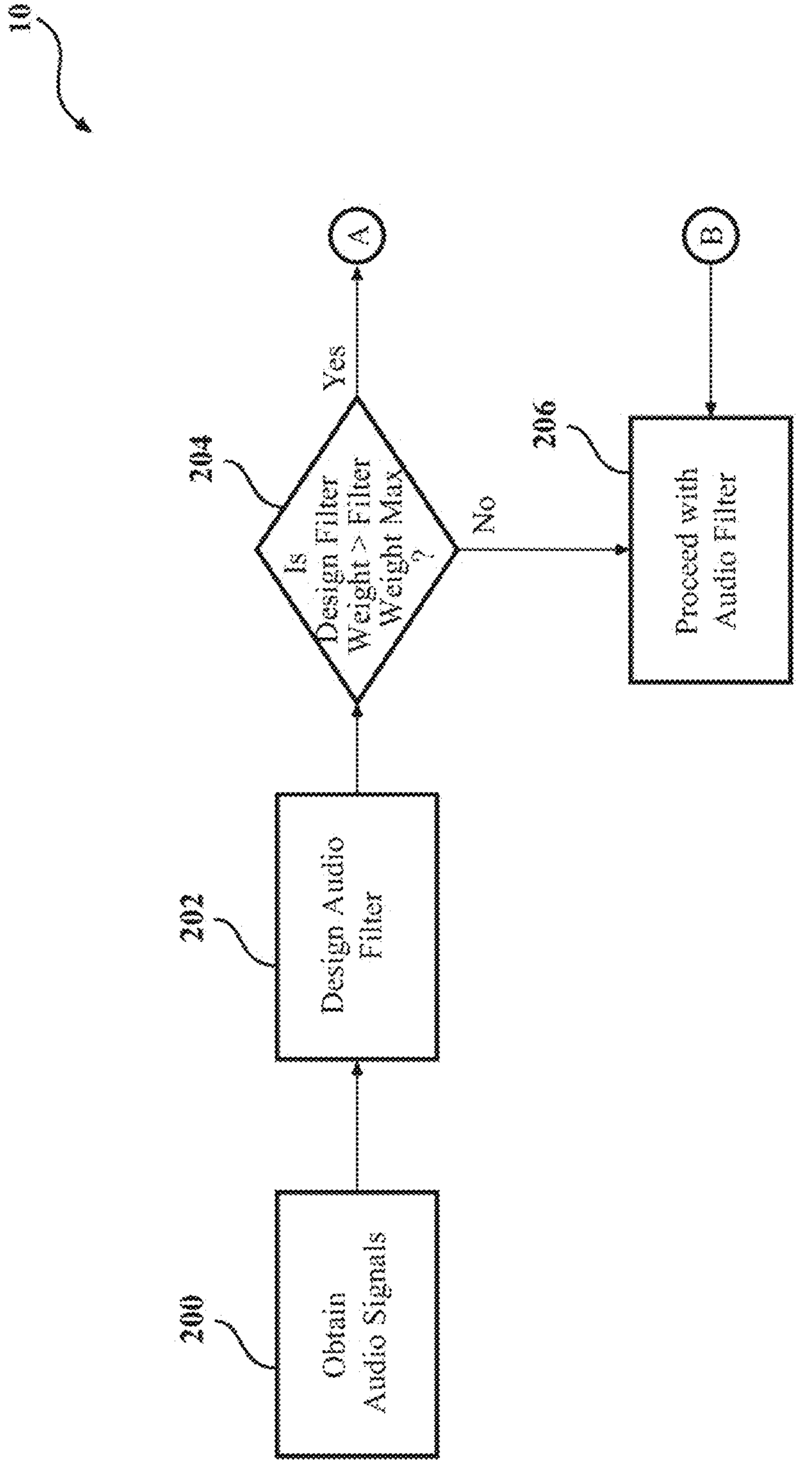
FIG. 5 is an example flow diagram for an audio filter system according to the present disclosure.
Figure 6:
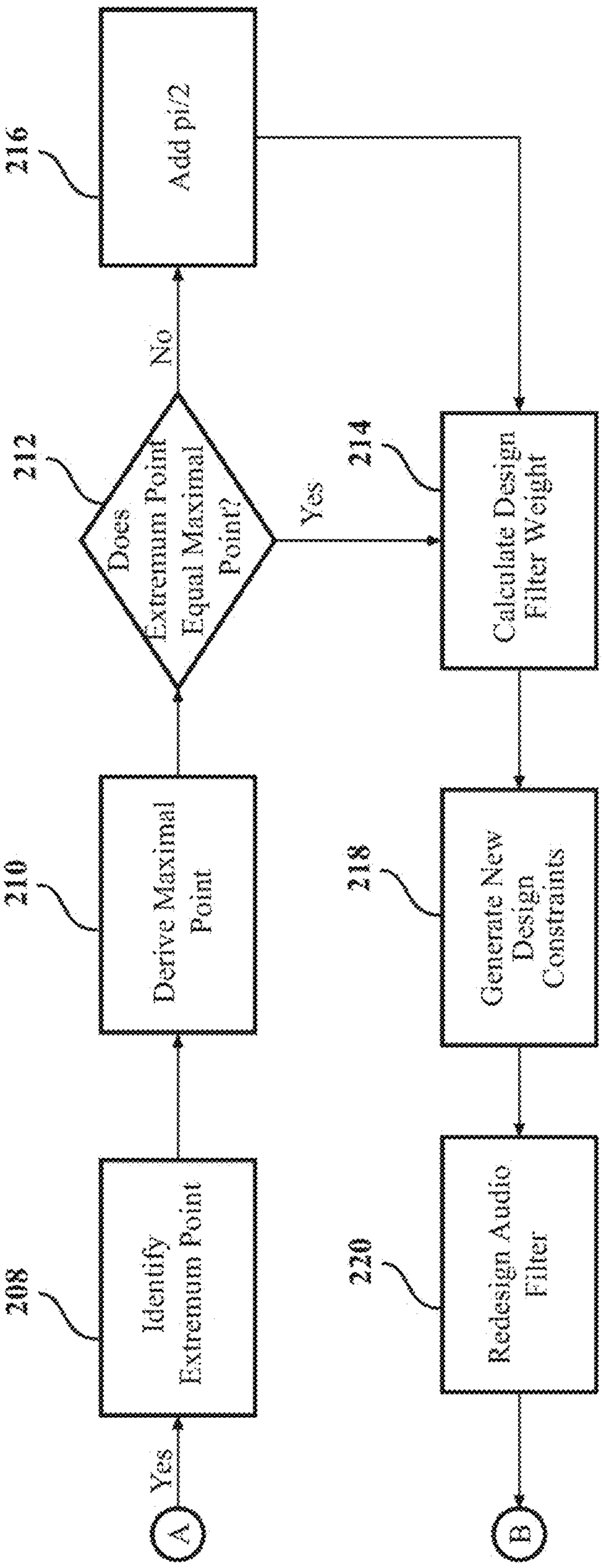
FIG. 6 is an example flow diagram for the audio filter system of FIG. 5 according to the present disclosure.

With specific reference to FIGS. 4 and 5, flow diagrams of a summary of an example process described herein of executing the audio filter system 10 are set forth. At an initial step 200, the audio signals 12 are obtained by the audio filter system 10. The data processing hardware 14, in response to receiving the audio signals 12, designs the audio filter 30, at 202. The data processing hardware 14 may then compare, at 204, the design filter weight 42 with the WNG filter weight maximum 44. If the design filter weight 42 does not exceed the WNG filter weight maximum 44, then the audio filter system 10 may, at 206, proceed with utilizing the designed audio filter 30.

If the design filter weight 42 exceeds the WNG filter weight 44, then the data processing hardware 14 may, at 208, execute the process for identifying the extremum point 56, as outlined above. The data processing hardware also, at 210, derives the maximal point 58 using, in part, the cost function 60. The data processing hardware 14 may then determine, at 212, whether the extremum point 56 corresponds to the maximal point 58. If the extremum point 56 corresponds with the maximal point 58, then the data processing hardware 14, at 214, may calculate design filter weight 42. If the extremum point 56 does not correspond with the maximal point 58, then the data processing hardware 14, at 216, adds the value of pi divided by two and proceeds to step 210. Based on the calculated design filter weight 42, the data processing hardware 14, at 218, may generate new design constraints 34. Finally, at step 220, the data processing hardware 14 may redesign the audio filter 30 using the new design constraints 34 from the extremum point 56.

Referring again to FIGS. 1-6 and as noted above, the audio signals 12 generally contain a single desired audio signal 12*a* and one or more interference audio signals 12*b*. The interference audio signals 12*b* are filtered by the designed audio filter 30 to mitigate background or other interference that may otherwise interfere with outputting the target audio signal 12*a*. Thus, the process of designing the audio filter 30 using the extremum point 56 and design constraints 34 advantageously attenuates the interference audio signals 12*b*. Further, the use of non-binary values 52 assists in softening the design constraints 34 by identifying specific values that can be then identified by the designed audio filter 30 beyond the binary.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method executed by data processing hardware that causes the data processing hardware to perform operations comprising:

receiving, from a sensor array, multiple audio signals including a target audio signal and interference audio signals;

identifying a design constraint based on the multiple audio signals, the design constraint including a pass constraint corresponding to the target audio signal and a null constraint corresponding to the interference audio signal;

generating an asymmetrical white noise gain surface from the audio signals in response to a design filter weight exceeding a filter weight maximum;

converting the asymmetrical white noise gain surface to a symmetrical white noise gain surface using a whitening function;

identifying an extremum point on the symmetrical white noise gain surface for the design constraint;

transforming the extremum point from the symmetrical white noise gain surface to the asymmetrical white noise gain surface;

updating the design constraint with the extremum point; and filtering the multiple audio signals using the extremum point and identified non-binary values.

2. The method of claim 1, further including designing an audio filter using the updated design constraint.

3. The method of claim 2, wherein designing the audio filter includes reducing the design filter weight and comparing the reduced value with the filter weight maximum.

4. The method of claim 1, wherein converting the asymmetrical white noise gain surface includes executing the whitening function using Cholesky decomposition.

5. The method of claim 1, wherein identifying the extremum point includes defining a cost function and deriving a maximal point by a closed form mathematical equation using the defined cost function.

6. The method of claim 5, wherein identifying the extremum point includes comparing the extremum point with the maximal point and identifying a correlation between the extremum point and the maximal point.

7. The method of claim 6, wherein the extremum point is defined by a maximal distance between a first point associated with the pass constraint and a second point associated with the null constraint.

8. An audio filter system for a vehicle, the audio filter system comprising:

data processing hardware; and memory hardware in communication with the data processing hardware, the memory hardware storing instructions that when executed on the data processing hardware cause the data processing hardware to perform operations comprising:

receiving, from a sensor array, multiple audio signals;

identifying a design constraint based on the multiple audio signals;

generating an asymmetrical white noise gain surface in response to a design filter weight exceeding a filter weight maximum;

converting the asymmetrical white noise gain surface to a symmetrical white noise gain surface using a whitening function;

identifying an extremum point on the symmetrical white noise gain surface for the design constraint;

transforming the extremum point from the symmetrical white noise gain surface to the asymmetrical white noise gain surface;

updating the design constraint with the extremum point; and filtering the multiple audio signals using the extremum point.

9. The audio filter system of claim 8, further including designing an audio filter using the design constraint.

10. The audio filter system of claim 9, wherein designing the audio filter includes reducing a value of filter weights of the designed audio filter and comparing the reduced value with the designed constraint.

11. The audio filter system of claim 8, wherein identifying the extremum point includes determining whether the extremum point corresponding with a maximal point.

12. The audio filter system of claim 11, wherein identifying the extremum point includes defining a cost function.

13. The audio filter system of claim 12, wherein identifying the extremum point includes deriving the maximal point by a closed form mathematical equation using the defined cost function.

14. The audio filter system of claim 13, wherein the maximal point is defined by a maximal distance between a first point associated with a pass constraint of the design constraint and a second point associated with a null constraint of the design constraint.

* * * * *